(12) United States Patent
Tan et al.

(10) Patent No.: US 11,874,687 B1
(45) Date of Patent: Jan. 16, 2024

(54) SYSTEM AND METHOD FOR OBTAINING USER INPUT USING PASSIVE HUMAN INTERFACE DEVICE

(71) Applicant: Dell Products L.P., Round Rock, TX (US)

(72) Inventors: Loo Shing Tan, Singapore (SG); Michiel Sebastiaan Emanuel Petrus Knoppert, Amsterdam (NL); Gerald Rene Pelissier, Mendham, NJ (US); Thomas Marcus Hinskens, Utrecht (NL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/181,112

(22) Filed: Mar. 9, 2023

(51) Int. Cl.
*G06F 3/0354* (2013.01)
*G06F 3/046* (2006.01)

(52) U.S. Cl.
CPC .......... *G06F 3/03545* (2013.01); *G06F 3/046* (2013.01)

(58) Field of Classification Search
CPC .. G06F 3/046; G06F 3/03545; G06F 3/03543; G06F 3/0354
USPC ......................................... 345/157, 163, 179
See application file for complete search history.

(56) References Cited

U.S. PATENT DOCUMENTS

| | | |
|---|---|---|
| 8,368,649 B2 | 2/2013 | Hall |
| 8,654,095 B1 | 2/2014 | Cho et al. |
| 9,323,356 B2 * | 4/2016 | Kuo ..................... G06F 3/03545 |
| 10,719,145 B1 | 7/2020 | Files et al. |
| 11,809,646 B1 | 11/2023 | Knoppert et al. |
| 2005/0083316 A1 | 4/2005 | Brian et al. |
| 2006/0205368 A1 | 9/2006 | Bustamante et al. |
| 2010/0053085 A1 | 3/2010 | Hall |
| 2013/0314338 A1 | 11/2013 | Nam et al. |
| 2014/0267150 A1 * | 9/2014 | Masashi ................. G06F 3/046 345/174 |
| 2015/0277598 A1 | 10/2015 | Aurongzeb et al. |
| 2016/0299606 A1 * | 10/2016 | Go ..................... G06F 3/04883 |
| 2016/0313819 A1 | 10/2016 | Ancona et al. |
| 2019/0113966 A1 | 4/2019 | Connellan et al. |
| 2019/0187856 A1 | 6/2019 | Bruwer et al. |
| 2019/0339776 A1 | 11/2019 | Rosenberg et al. |
| 2020/0004346 A1 | 1/2020 | Masov et al. |
| 2020/0371625 A1 | 11/2020 | Katsurahira et al. |

* cited by examiner

*Primary Examiner* — Koosha Sharifi-Tafreshi
(74) *Attorney, Agent, or Firm* — Womble Bond Dickinson (US) LLP

(57) ABSTRACT

Methods and systems for providing computer implemented services using user input are disclosed. To obtain the user input, a passive human interface device may be used. The human interface device may include a magnet that may produce a magnetic field used to discern the user input. The magnet may be mechanically coupled to actuatable portions of the human interface device thereby encoding information regarding both of changes in position of the human interface device and actuations of the actuatable portions into a magnetic field emanating from the human interface device. Sensing elements integrated into a sensing system may be used to sense the emanating magnetic field to obtain user input from the human interface device.

20 Claims, 10 Drawing Sheets

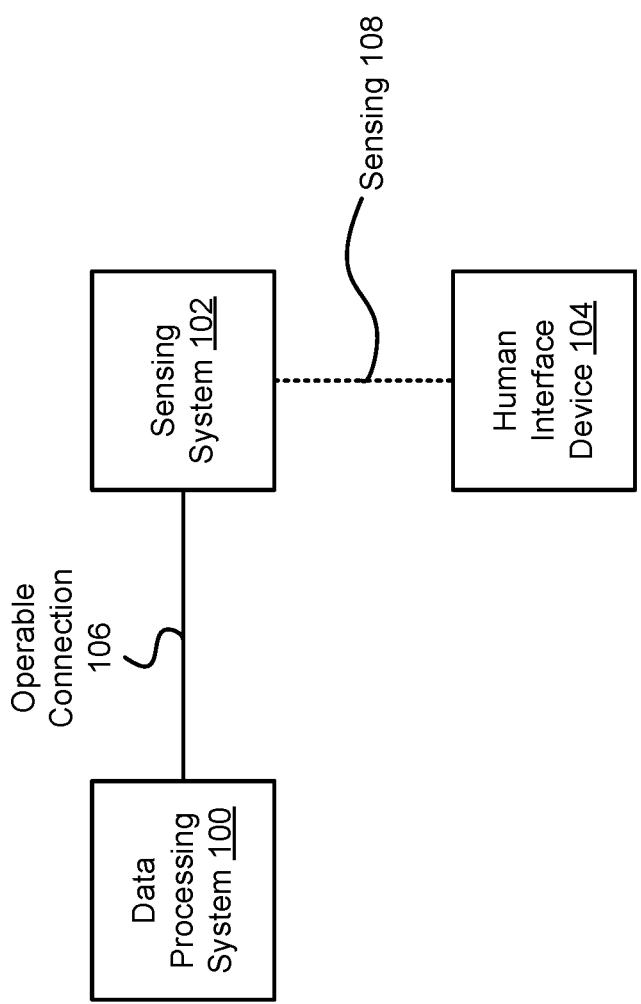

SYSTEM AND METHOD FOR OBTAINING USER INPUT USING PASSIVE HUMAN INTERFACE DEVICE

FIELD

Embodiments disclosed herein relate generally to user input in computing systems. More particularly, embodiments disclosed herein relate to systems and methods to obtain user input.

BACKGROUND

Computing devices may provide computer implemented services. The computer implemented services may be used by users of the computing devices and/or devices operably connected to the computing devices. The computer implemented services may be performed using input from users. For example, users of computing devices may provide input as part of the computer implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a block diagram illustrating a system in accordance with an embodiment.

DETAILED DESCRIPTION

Figure 2A:
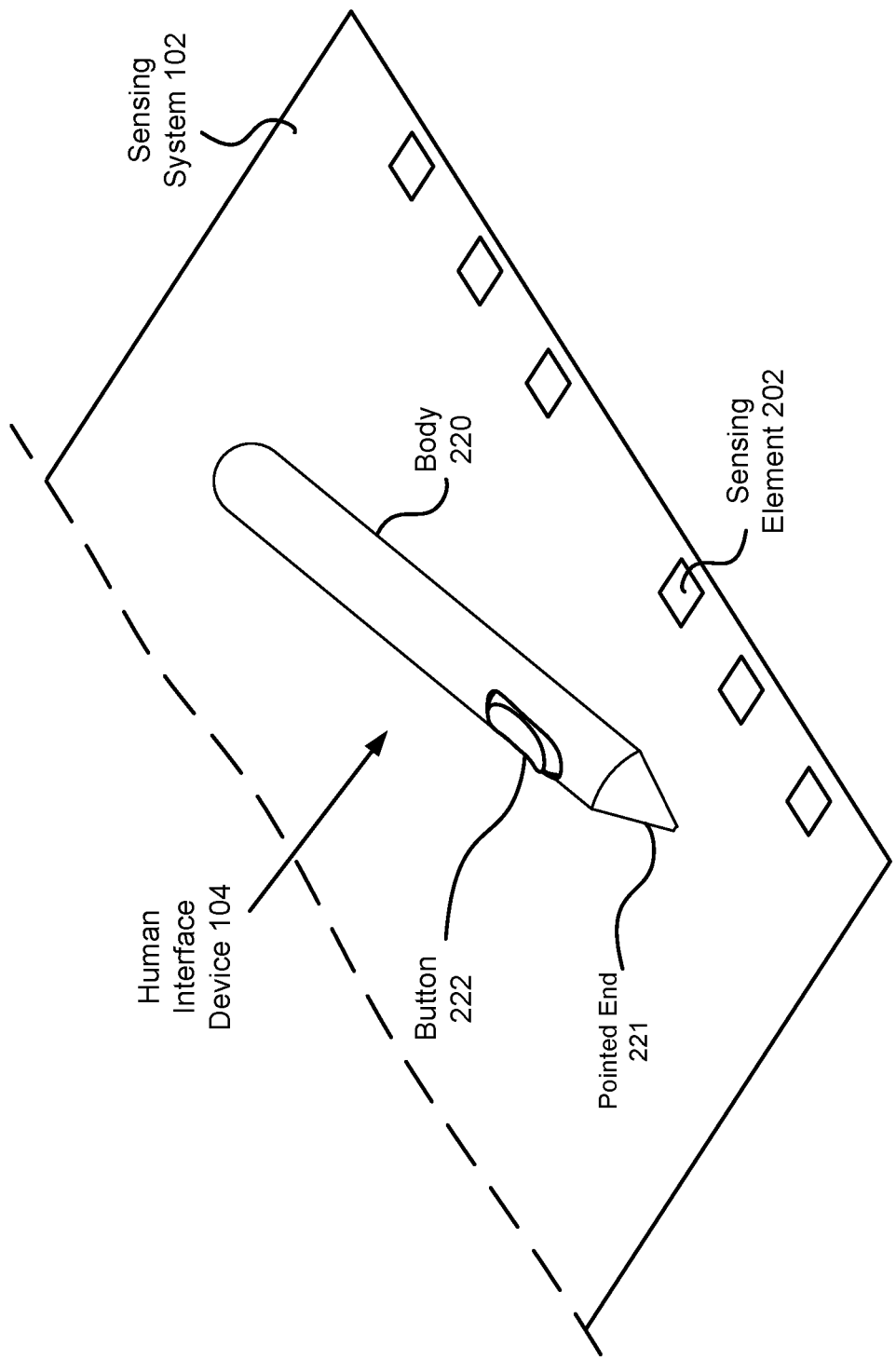
FIG. 2A shows a diagram illustrating a human interface device and a sensing system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services. To provide the computer implemented services, user input may be obtained.

To obtain the user input, a human interface device may be used. The human interface device may be actuated by a user, and the actuations may be translated into magnetic fields detectable by a sensing system. The sensing system may sense the magnetic fields and obtain information reflecting changes in the position and/or orientation of a magnet of the human interface device that generates the magnetic fields. Thus, information reflecting actuations of the human interface device by the user may be encoded in the magnetic fields and may be sensed through measurement of the magnetic fields.

The obtained information may be used to identify, for example, user input provided by the user. For example, the information regarding changes in the position and/or orientation of the magnet may be translated into user input. The user input may be used to drive computer implemented services.

For example, the user input may be provided by the user to activate certain functionalities, change functionalities, terminate functionalities, and/or invoke desired activities by a data processing system.

To encode information regarding different types of actuations of human interface devices, the human interface devices may include mechanical linkage between actuatable portions of the human interface device and a magnet. The mechanical linkage may limit motion of the magnet with respect to the human interface device until a sufficient level of pressure is applied to an actuatable portion of the human interface device. Once reached, resistance to the applied force may be reduced resulting in the magnet rapidly accelerating for a short duration of time and then rapidly decelerating. The resulting change in position of the magnet may encode sufficient information in the magnetic field emanating from the human interface device to distinguish actuations of the human interface device from repositioning of the human interface device.

By using a magnet and mechanical linkage to the magnet, the human interface device may not need to be powered, may include fewer components thereby reducing the likelihood of component failures, may be made lighter/smaller thereby reducing loads placed on user of user input devices, etc.

By doing so, a system in accordance with embodiments disclosed herein may have improved portability and usability when compared to other types of devices used to obtain user input that may be powered. Thus, embodiments disclosed herein may address, among others, the technical challenge of loads placed on users during acquisition of user input and mechanical or electrical failure of devices tasked with obtaining user input.

In an embodiment, a human interface is provided. The human interface device may include a body movable through application of force by a user; a magnet positioned with the body, the magnet emanating a magnetic field distribution that extends into an ambient environment proximate to the human interface device; a button; and a mechanical linkage adapted to: receive a force from the button; in a first instance of the force that falls below a threshold: retain a first position of the magnet within the body; and in a second instance of the force that exceeds the threshold: accelerate the magnet in a first direction to move the magnet to a second position within the body; and after the force is reduced, return the magnet to the position.

The button may be adapted to move between two positions along a motion path, and the motion path may be aligned with a second direction that is different from the first direction.

While in the first position, at least a portion of the button may be exposed above a surface of the body, and while in the second position, at least a sub portion of the portion of the button may be recessed below the surface of the body.

The mechanical linkage may include a slider adapted to receive a force in the second direction from the button; and apply a force in the first direction to the magnet.

The mechanical linkage may also include a concave ramp adapted to restrict movement of the slider to a second motion path, the second motion path including a curved path.

The mechanical linkage may further include an elastic member adapted to transition between two shapes, while in a first shape of the two shapes, the elastic member maintains the magnet in the first position, and while in a second shape of the two shapes, the elastic member may allow the magnet to move to the second position.

While in the second shape, the elastic member may exhibit internal strain to transition to the first shape.

The elastic member may include a dome switch.

In an embodiment, a user input system is provided. The user input system may include a human interface device as discussed above and a sensing system adapted to measure the magnetic field emanating from the magnet.

In an embodiment, a data processing system is provided. The data processing system may include a user input system as discussed above, a processor, and a memory coupled to the processor to store instructions, which when executed by the processor, cause the processor to perform operations for obtaining user input using data obtained from the sensing system.

In an embodiment, a non-transitory media is provided. The non-transitory media may include instructions that, when executed by a processor, may cause operation for obtaining user input using data obtained from the sensing system, as discussed above.

Turning to FIG. 1, a block diagram illustrating a system in accordance with an embodiment is shown. The system shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, user input may be obtained. The user input may indicate, for example, how the computer implemented services are to be provided. The user input may include any type and quantity of information.

To obtain the user input, a user may perform physical actions such as, for example, pressing buttons, moving structures, etc. These physical actions may be sensed by various devices, and the sensing may be interpreted (e.g., translated) into the user input (e.g., data).

However, sensing physical actions by a user may involve use of sensors and/or devices that may consume power. The weight of the devices and forces applied by sources of the consumed power (e.g., batteries, cords to power supplies, etc.) may place a load (e.g., mechanical) on the user attempting to perform the physical actions. The mechanical load may fatigue the user, reduce the portability of the devices (e.g., mouses, pens, keyboards, etc.), and/or may be undesirable for other reasons.

In general, embodiments disclosed herein may provide methods, systems, and/or devices for obtaining user input and/or using the obtained user input to provide computer implemented services. To provide the computer implemented services, a system may include data processing system 100.

Data processing system 100 may include hardware components usable to provide the computer implemented services. For example, data processing system 100 may be implemented using a computing device such as a laptop computer, desktop computer, portable computer, and/or other types of computing devices.

Data processing system 100 may host software that may use user input to provide the computer implemented services. For example, the software may provide user input fields and/or other elements through which the user may provide information to manage and/or use the computer implemented services provided by data processing system 100.

To obtain the information from the user, data processing system 100 may obtain signals and/or data from sensing system 102 (e.g., via operable connection 106). Data processing system 100 may interpret (e.g., translate) the signals (e.g., may be analog, data processing system 100 may include an analog to digital converter) and/or data (e.g., digital data) to obtain the user input.

Sensing system 102 may track (e.g., by sensing 108) and/or provide information regarding tracking of human interface device 104, and/or provide the signals and/or data to data processing system 100. A user may physically interact with human interface device 104, thereby allowing the signals and/or data provided by sensing system 102 to include information regarding the physical actions of the user.

For example, if a user moves human interface device 104, sensing system 102 may track the change in position and/or motion of human interface device 104 and provide signals and/or data reflecting the changes in position and/or motion. Similarly, if a user actuates an actuatable portion (e.g., buttons) of human interface device, sensing system 102 may track the actuation of the actuatable portion and provide signals and/or data reflecting the actuation.

To track human interface device 104, sensing system 102 may include one or more sensors that sense a magnetic field emanating from human interface device 104. The sensors may use the sensed magnetic field to track a location (absolute or relative) and orientation (absolute or relative) of a magnet embedded in human interface device 104. The sensors may generate the signals and/or data provided by sensing system 102 to data processing system 100. The sensors may sense the magnitude and/or direction of the magnetic field that passes proximate to each sensor. By knowing the relative placements of the sensors with respect to one another, the position and/or orientation of a magnet that generates the magnetic field may be known (e.g., the magnetic field may be treated as emanating from a magnet with known dimensions and/or strength).

Sensing system 102 may also include, for example, analog to digital converters, digital signal processing devices or other signal processing devices, and/or other devices for generating the signals and/or data based on information obtained via the sensors.

Human interface device 104 may be implemented with a physical device that a user may actuate in one or more ways. For example, human interface device 104 may (i) be moveable, (ii) may include one or more buttons, and/or may include other actuatable elements. Actuating human interface device 104 may change the orientation and/or position of the magnet with respect to the sensors of sensing system 102.

For example, when human interface device 104 is moved away from sensing system 102, the strength of the magnetic field emanating from the magnet as sensed by sensors of sensing system 102 may decrease. Similarly, when buttons or other actuatable elements of human interface device 104 are actuated, the magnet may translate (e.g., in one or more planes) thereby changing the strength of the magnetic field sensed by sensors of sensing system 102. Information regarding the actuation of human interface device 104 may be encoded using different schemes without departing from embodiments disclosed herein.

Figure 2B:
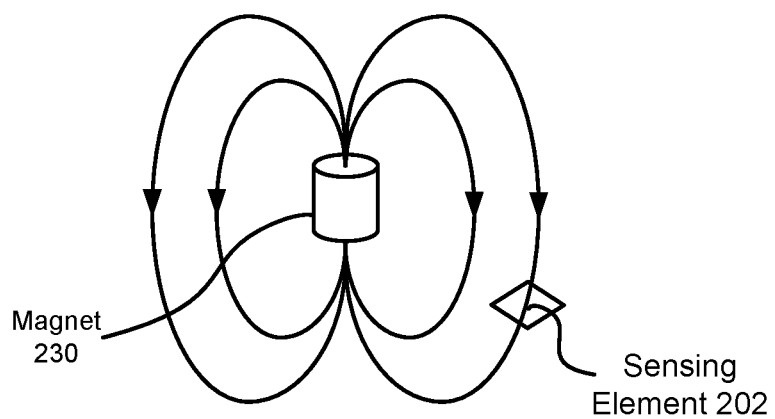
FIGS. 2B-2C show diagrams illustrating field sensing in accordance with an embodiment.
Figure 2C:
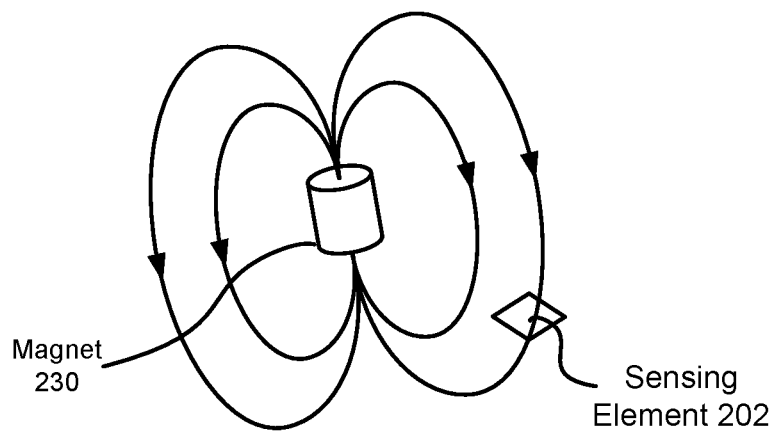

For example, information regarding actuation of buttons or other elements of human interface device 104 may be encoded in rapid shifts in field strength sensed by sensing system 102. To generate a rapid shift in sensed field strength, a button may be mechanically coupled to a mechanism that rapidly changes the position of the magnet within human interface device 104. The resulting rapid change in magnetic field strength as sensed by sensing system 102 may be used to distinguish actuations of actuatable portions of human interface device 104 from repositioning of human interface device 104 (which may also change the field strength sensed by sensing system 102, but may do so more slowly when compared to rapid repositioning of magnets within human interface device 104). Refer to FIGS. 2A-2C for additional details regarding sensing of human interface device 104.

Human interface device 104 may be a passive device. For example, human interface device 104 may not consume power, include batteries or sensors, etc. Consequently, human interface device 104 may be of smaller size, lower weight, and/or may provide other advantages when compared to active devices (e.g., a computer mouse, computer stylus, etc.). Refer to FIGS. 2A-2H for additional details regarding human interface device 104.

Data processing system 100 or sensing system 102 may perform pattern matching or other types of operations (e.g., performing a lookup) to translate the signals and/or data from sensing system 102 into user input. Once obtained, the user input may be used to drive downstream processes such as any type of computer implemented service.

Figure 3:
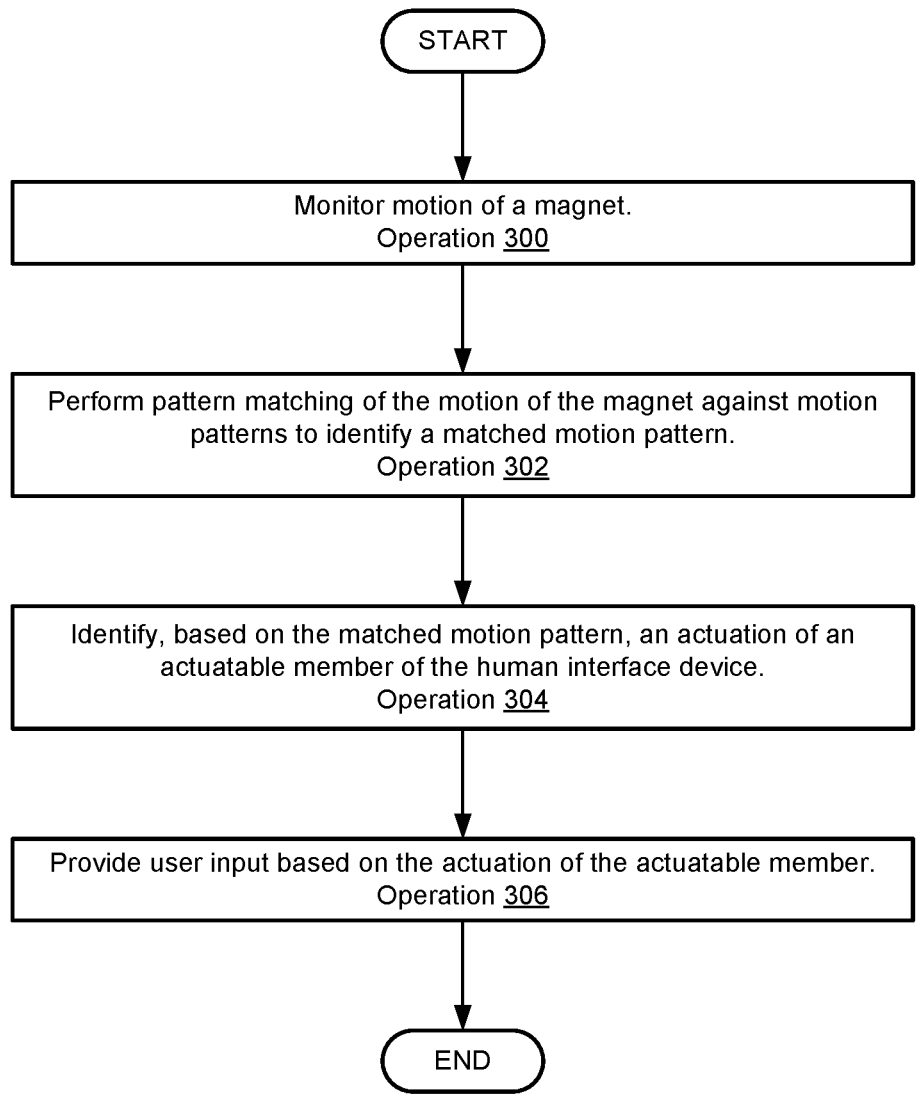
FIG. 3 shows a flow diagram illustrating a method of obtaining user input and providing computer implemented services in accordance with an embodiment.

When providing its functionality, data processing system 100 may perform all, or a portion, of the method illustrated in FIG. 3.

Data processing system 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated). For example, sensing system 102 may be operably connected to data processing system 100 via a wired (e.g., USB) or wireless connection. However, in some embodiment, human interface device 104 may not be operably connected to other device (e.g., may be a passive device), but may be sensed by sensing system 102 via sensing 108. For example, during sensing 108, a static magnetic field emanating from human interface device 104 may be sensed by sensing system 102.

While illustrated in FIG. 1 as included a limited number of specific components, a system in accordance with an embodiment may include fewer, additional, and/or different components than those illustrated therein.

To further clarify embodiments disclosed herein, diagrams illustrating sensing of human interface device 104 in accordance with an embodiment are shown in FIGS. 2A-2C.

Turning to FIG. 2A, an isometric diagram of human interface device 104 and sensing system 102 in accordance with an embodiment is shown. Human interface device 104, as noted above, may be implemented using a passive physical structure through which use input based on actuation of human interface device 104 may be provided by a user.

To obtain user input from the user, human interface device 104 may include body 220, any number of actuatable elements (e.g., 222), and at least one magnet (not shown). Body 220 may be implemented with a structure upon which other elements may be affixed. For example, body 220 may be implemented with a plastic injection molded component or other structure. Body 220 may have an elongated, oblong shape with one end being pointed (e.g., pointed end 221).

At least one magnet may be positioned within body 220. The magnet may be mechanically coupled to both body 220 and an actuatable component such as button 222. Consequently, when a user (i) moves body 220 or (ii) actuates button 222, the magnet within body 220 may also be moved. Movement of the magnet may change the magnetic field as sensed by sensing system 102 thereby allowing for the actuations of body 220 and button 222 to be identified by sensing system 102.

For example, when body 220 moves within a proximity of sensing system 102 the magnetic field sensed by sensing elements (e.g., 202) of sensing system 102 may change. Thus, one form of actuation of human interface device 104 may be for a person to grip body 220 and apply force for to it to move it with respect to sensing system 102 (thereby repositioning it with respect to sensing elements of sensing system 102, discussed below).

In another example, when button 222 is actuated by a user, the magnet within body 220 may be rapidly moved with respect to body 220. While the distance moved may be small, the small change in distance and rapidity of movement may result in the magnetic field sensed by sensing elements of sensing system 102 changing sufficiently for the actuation of button 222 to be distinguished from general repositioning of body 220.

To obtain user input via actuation of button 222, any number of actuatable elements (e.g., button 222) may be positioned on body 220. Generally, the actuatable elements (e.g., 222) may be positioned on a top surface (e.g., exterior surface) of human interface device 104. However, the actuatable elements may be positioned elsewhere (e.g., that may be more difficult for a person to reach) without departing from embodiments disclosed herein. The actuatable elements may be actuatable by a person through application of force. Refer to FIGS. 2D-2H for additional details regarding actuation of the actuatable elements by application of force.

Button 222 may be implemented, for example, with surfaces that may be actuated through application of force (i) that is orthogonal to the surface and directed toward an interior of body 220, or (ii) parallel to the surface (e.g., sliding a button along a surface of body 220 rather than pushing the button inward). Any of the buttons may be coupled to a return mechanism that may return the buttons to a resting position while force are not applied to the buttons.

Application of force to body 220 may reposition human interface device 104 with respect to sensing elements of sensing system 102. For example, the force may change both the position and orientation of human interface device 104 with respect to sensing system 102.

In contrast, application of force to the actuation elements may change a position or orientation of a magnet embedded inside of body 220 with respect to the sensing elements of sensing system 102. For example, application of force to button 222 may accelerate the magnet forwards or backwards along a length of body 220 (e.g., along a first directional path). The resulting changes in sensed magnetic field by sensing system 102 may allow the actuation of button 222 to be detected. For example, the rotation and/or repositioning of the magnet may modify the magnetic field applied to the sensing elements of sensing system 102. Refer to FIGS. 2B-2C for additional details regarding the magnetic field emanating from human interface device 104. Refer to FIGS. 2D-2H for additional details regarding the magnet embedded in human interface device 104.

Like body 220, the actuatable elements may generally be formed from plastic injection molded or other types of plastic and/or molded parts.

To obtain user input, sensing system 102 may include any number of sensing elements (e.g., 202). The sensing elements may be sensors that monitor a magnitude and direction of a magnetic field and generate signals or data to reflect these quantities. While not shown, sensing system 102 may include a signal processing chain (e.g., any number of signal conditioning and processing devices) that may condition and process the signals generated by the sensing elements to obtain information regarding the location and/or orientation of the magnet embedded in human interface device 104.

In FIG. 2A, sensing system 102 is illustrated in the form of a pad or other structure upon which human interface device 104 may be positioned (the dashed line to the top left of the drawing indicates that the structure may continue on beyond that which is explicitly illustrated). However, sensing system 102 may be implemented with other types of structures.

Additionally, while the sensing elements are illustrated with example positions, it will be appreciated that the sensing elements may be positioned differently without departing from embodiments disclosed herein.

Turning to FIGS. 2B-2C, diagrams illustrating a magnet and sensing element 202 in accordance with an embodiment are shown. As noted above, human interface device 104 may include magnet 230. Magnet 230 may project a magnetic field. In these figures, the magnetic field is illustrated using lines with arrows superimposed over the midpoints of the lines. The direction of the arrow indicates an orientation of the field.

As seen in FIG. 2B, when magnet 230 is proximate (e.g., within a predetermined distance range, which may vary depending on the strength of magnet 230 and sensitivity level of sensing element 202) to sensing element 202, the magnetic field may be of sufficient strength to be measurable by sensing element 202. Sensing element 202 may utilize any sensing technology to measure the magnitude and/or the orientation of the magnetic field at its location. Due to the field distribution of magnet 230, the magnitude and orientation of the magnetic field at the location of sensing element 202 may be usable to identify, in part, the location and orientation of magnet 230.

For example, when magnet 230 is rotated as shown in FIG. 2C from the orientation as shown in FIG. 2B, the direction and/or magnitude of the magnetic field at the location of sensing element 202 may change. By identifying the magnitude and orientation of the magnetic field at a number of locations (e.g., corresponding to different sensing elements), the position and orientation of magnet 230 may be identified.

To utilize the location and orientation of the magnet embedded in human interface device 104 to obtain user input, magnet 230 may be mechanically coupled to one or more of the actuatable elements (e.g., 222) and body 220.

To further clarify the mechanical coupling of actuatable elements and magnets, diagrams illustrating example mechanical coupling between magnet 230 and various portions of human interface device 104 over time in accordance with an embodiment are shown in FIGS. 2D-2H.

Figure 2D:
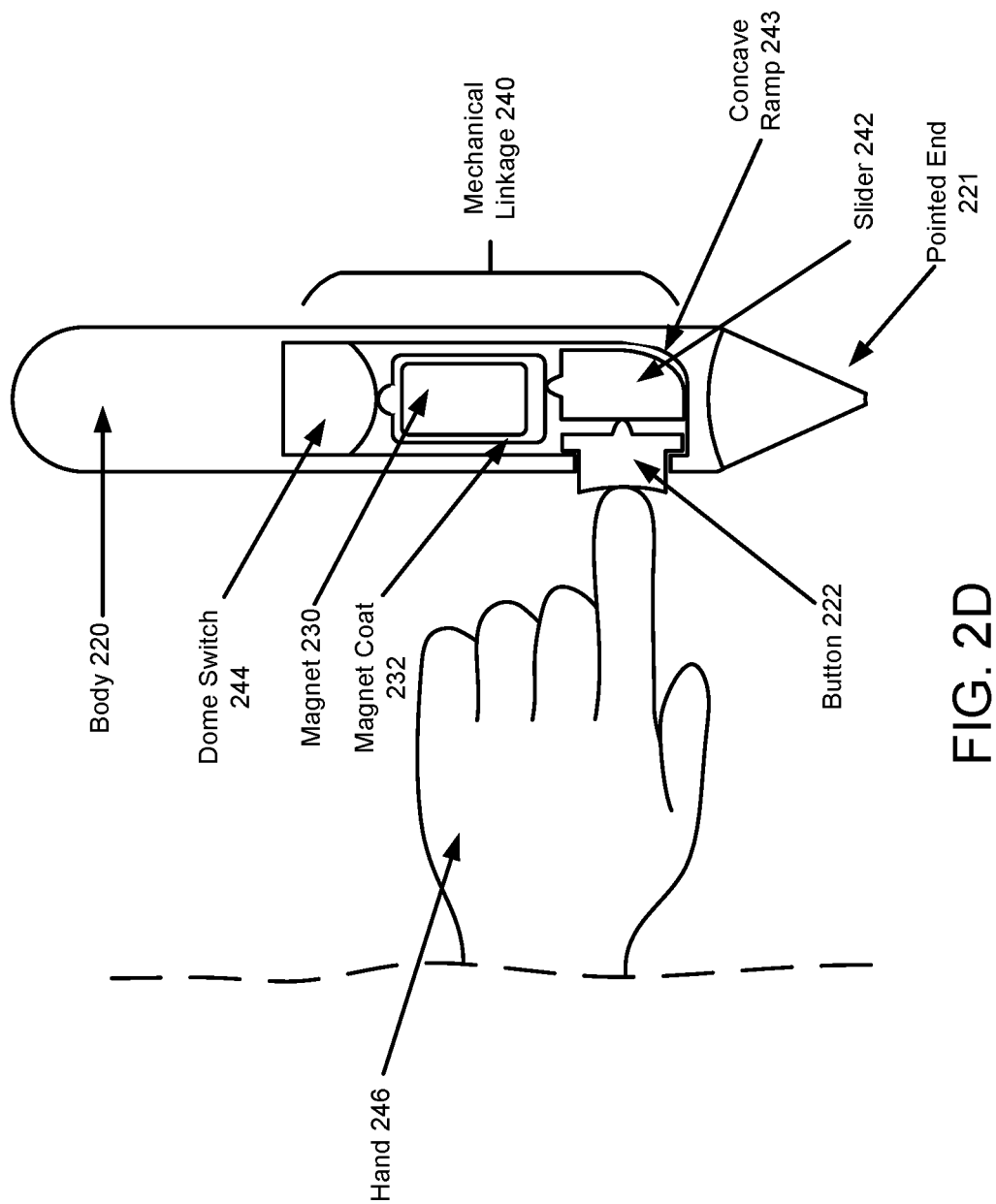
FIGS. 2D-2H show cross section diagrams illustrating a human interface device over time in accordance with an embodiment.

Turning to FIG. 2D, a first cross section diagram showing human interface device 104 in accordance with an embodiment is shown.

As seen in FIG. 2D, to mechanically couple magnet 230 to button 222, human interface device 104 may include a mechanical linkage (e.g., 240). The mechanical linkage may mechanically couple button 222 to magnet 230 such that actuations of button 222 cause magnet 230 to rapidly change locations within body 220.

Mechanical linkage 240 may include slider 242, a concave ramp (e.g., 243), and an elastic member (e.g., dome switch 244). Each of these components is discussed below.

Slider 242 may be implemented with a structure that translates force applied to button 222 to force applied to magnet 230. The force applied by magnet 230 may reposition magnet 230 within body 2220. Slider 242 may include (i) a first portion adapted to apply a force in a first direction to the magnet (e.g., up/down in FIG. 2D), and/or (ii) a second portion adapted to receive a force in a second direction from the button (e.g., left/right in FIG. 2D). The first portion and the second portion may be separated by an interface portion that mechanically interfaces with concave ramp 243.

For example, when force is applied to second portion, concave ramp 243 may limit movement of slider 242 thereby establishing an interference. The surface of concave ramp 243 that causes the interferences may be ramped thereby causing slider 242 to rotate when force is applied to second portion. The rotation of slider 242 with respect to concave ramp 243 may cause the first portion to apply the force to magnet 230.

Concave ramp 243 may be implemented with an internal structure of body 220. This internal structure may be adapted to restrict movement of slider 242 to a motion path. The motion path may include a curved portion such that movement of slider 242 along the motion path causes slider 242 to rotate. The rotation of slider 242 may translate the force received via second portion (e.g., in a first direction) to the second force (e.g., in a second direction) that is applied to magnet 243.

The elastic member may be implemented using a dynamic structure such as a dome switch (e.g., 244). This dynamic structure may maintain a first shape until a threshold of force applied to the elastic member is exceeded. If exceeded, the dynamic structure may change to a second shape. When the force applied falls under the threshold after being in the second shape, then the elastic member may automatically revert to the first shape. Thus, the elastic member may be adapted to transition between the two shapes (the first and second shape).

While in the first shape of the two shapes, the elastic member may be positioned to maintain the magnet in the first position (as illustrated in FIG. 2D), and while in the second shape of the two shapes, the elastic member may be positioned to allow the magnet to move to a second position (to be discussed with regard to FIGS. 2E-2H).

to facilitate transitioning between the two positions, magnet 230 may be covered in magnet coat 232. Magnet coat 232 may be adapted to allow smooth motion of magnet 230 between the first position and the second position. Magnet coat 232 may be implemented using, for example, a polymer layer or other material that may reduce sliding friction (e.g., when compared to magnet materials or other materials used to implement magnet 230).

Accordingly, when a user of human interface device 104 (e.g., hand 246) actuates button 222 using a user's hand (e.g., 246), the force may be transmitted to slider 242. The force may cause slider 242 to move along concave ramp 243. This motion may result in slider 242 applying force to magnet 230. The force may be transmitted from magnet 230 to dome switch 244 thereby causing dome switch 244 to change shape (if the force is of sufficient magnitude) thereby allowing magnet 230 to move rapidly within body 220.

When the final force exceeds the threshold of force required to change dome switch 244 from the first shape (as in FIG. 2D) to the second shape (as in FIG. 2F), then the transition between shapes may allow space within body 220 to increase. This increase in space may allow for the magnet to accelerate (the acceleration being caused by the final force) towards dome switch 244. The acceleration may be enhanced due to the threshold level of force required for deformation of dome switch 244 when compared to acceleration of magnet 230 in the absence of dome switch 244.

The actuation elements (e.g., 222) may be implemented with a post, bar, or other mechanical structure. For example, the mechanical structure may be a post extending from a bottom surface of button 222. The actuation elements may be positioned with other structures to limit the degree of movement of one or more components of human interface device 104.

Additionally, the actuation elements may be positioned with other structures to generate auditory signals (e.g., clicking noises), tactile signals, or other types of feedback (e.g., haptic feedback) for users of human interface device 104. The auditory/tactile signals may alert a user of human interface device 104 that sufficient force has been applied to a button for user input to be discerned by a data processing system (sufficient force to transition dome switch 244 from the first shape to the second shape).

For example, haptic feedback may be sensed by an appendage (e.g., hand 246) used by the user to actuate it. The haptic feedback may be provided using a structure such as a noise making component that generates a sound when pressure of a sufficient magnitude is applied to one of its surfaces.

To further clarify the operation of human interface device 104, cross section views of human interface device 104 over time in accordance with an embodiment are shown in FIGS. 2E-2H, with FIG. 2D illustrating the human interface device 104 before actuation of button 222.

Additionally, in FIGS. 2E-2H, arrows have been with infill patterns have been added. These arrows may identify directions in which forces are applied. Lastly numbers circled nearest a respective arrow indicate a potential sequential order in which each force is applied.

Figure 2E:
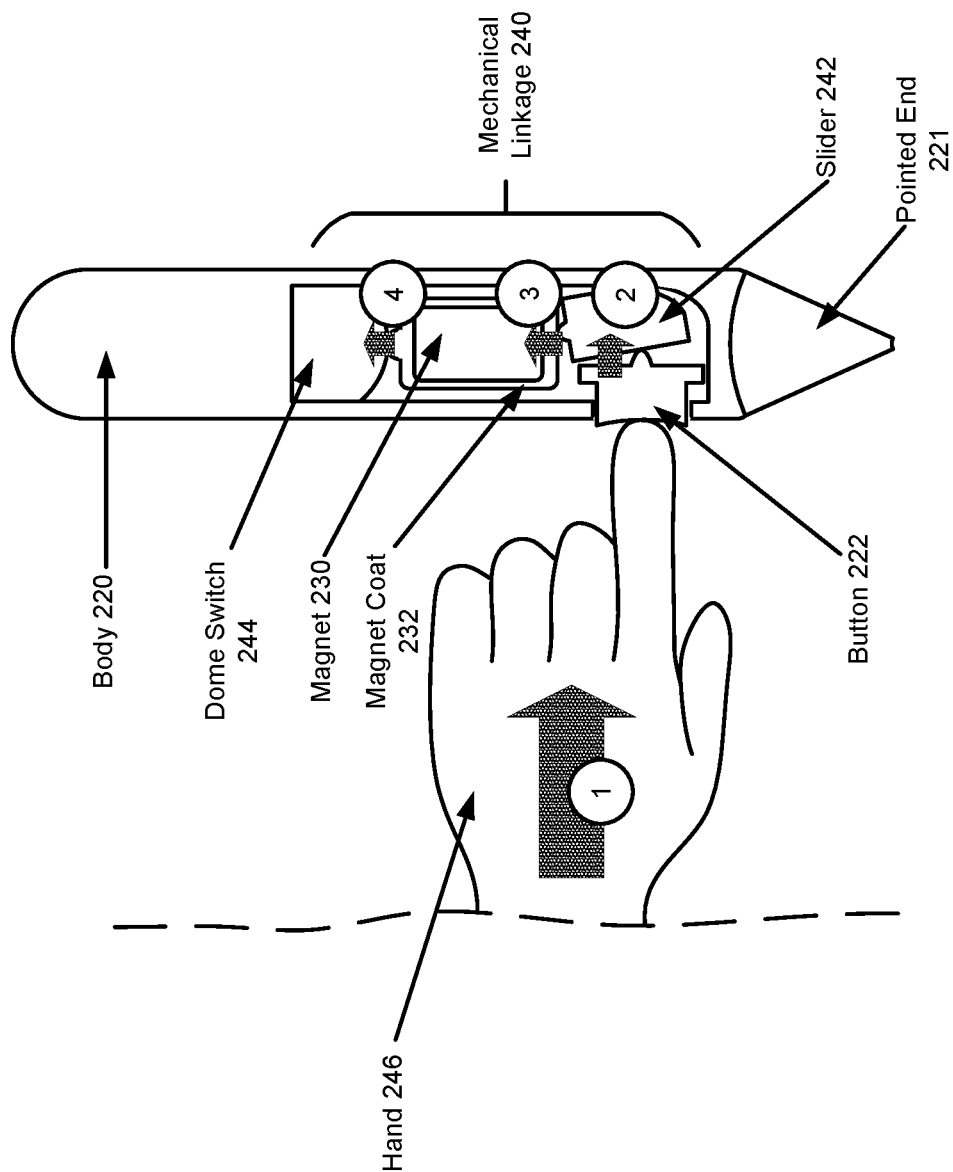

Turning to FIG. 2E, a second cross section diagram showing human interface device 104 in accordance with an embodiment is shown. As seen in FIG. 2E, hand 246 may apply a first force in the direction of button 222 (as indicated by the first arrow on the left). This first force may cause actuation of button 222. The actuation may cause an application of a second force (indicated by the second arrow) onto slider 242. This second force may cause a displacement of slider 242 away from a first position of slider 242 (e.g., illustrated in FIG. 2D, before actuation). Displacement of slider 242 may cause a third force to be applied to magnet 230 from the displacement of slider 242. Application of the third force may cause a fourth force to be applied to dome switch 244 from magnet 230.

If the fourth force does not exceed the threshold for the transition from the first shape to the second shape of dome switch 244 (discussed previously), dome switch 244 may maintain, for example, a convex shape. This first shape may restrict the movement of magnet 230.

Figure 2F:
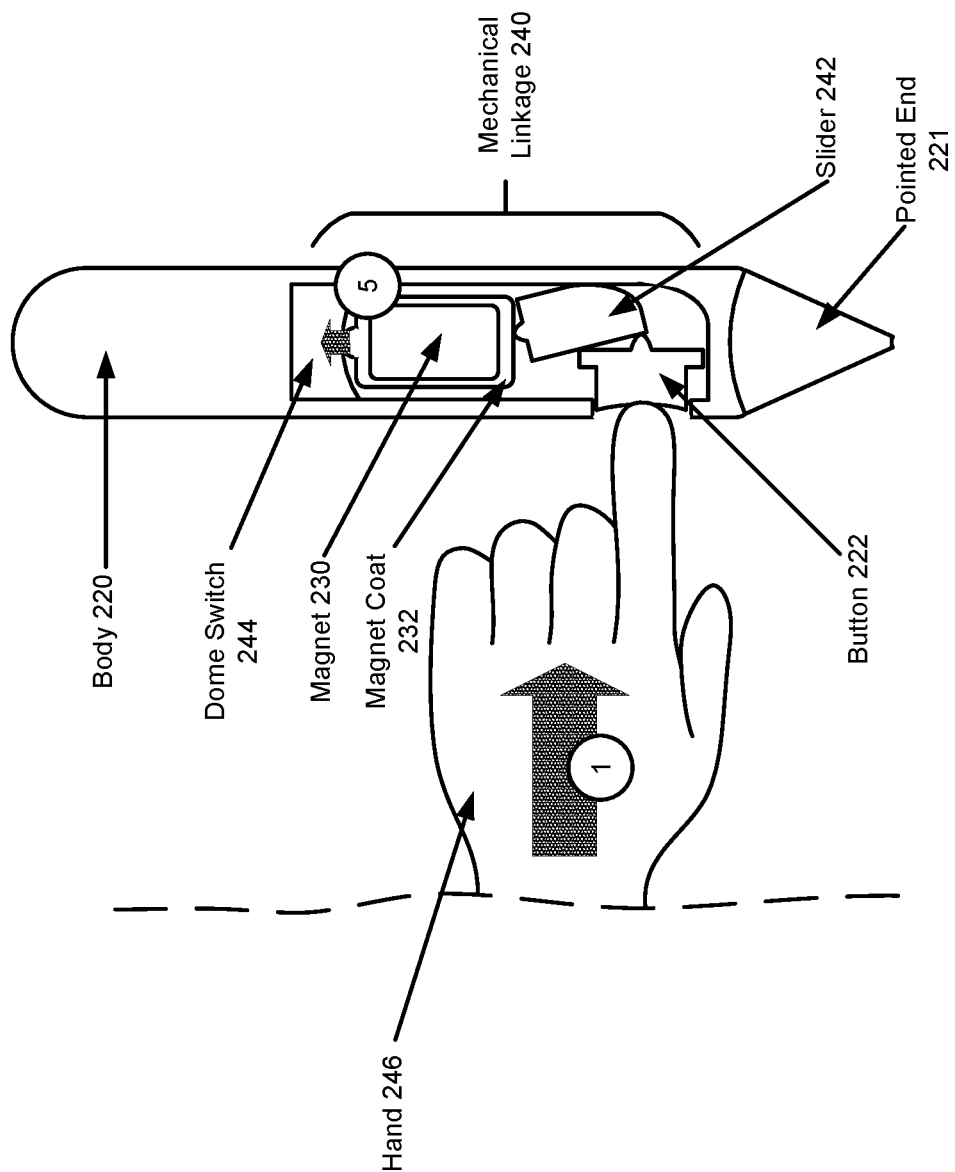

Turning to FIG. 2F, a third cross section diagram showing human interface device 104 in accordance with an embodiment is shown. As seen in FIG. 2F, If the fourth force does exceed the threshold, then dome switch 244 may be changed into the second shape as shown in FIG. 2F. The change in shape of dome switch 244 may allow for an acceleration of magnet 230 in a second direction until the dome switch 244 is reached. This acceleration may be identified by a sensing system to interpret user input (discussed further below with respect to FIG. 3).

Figure 2G:
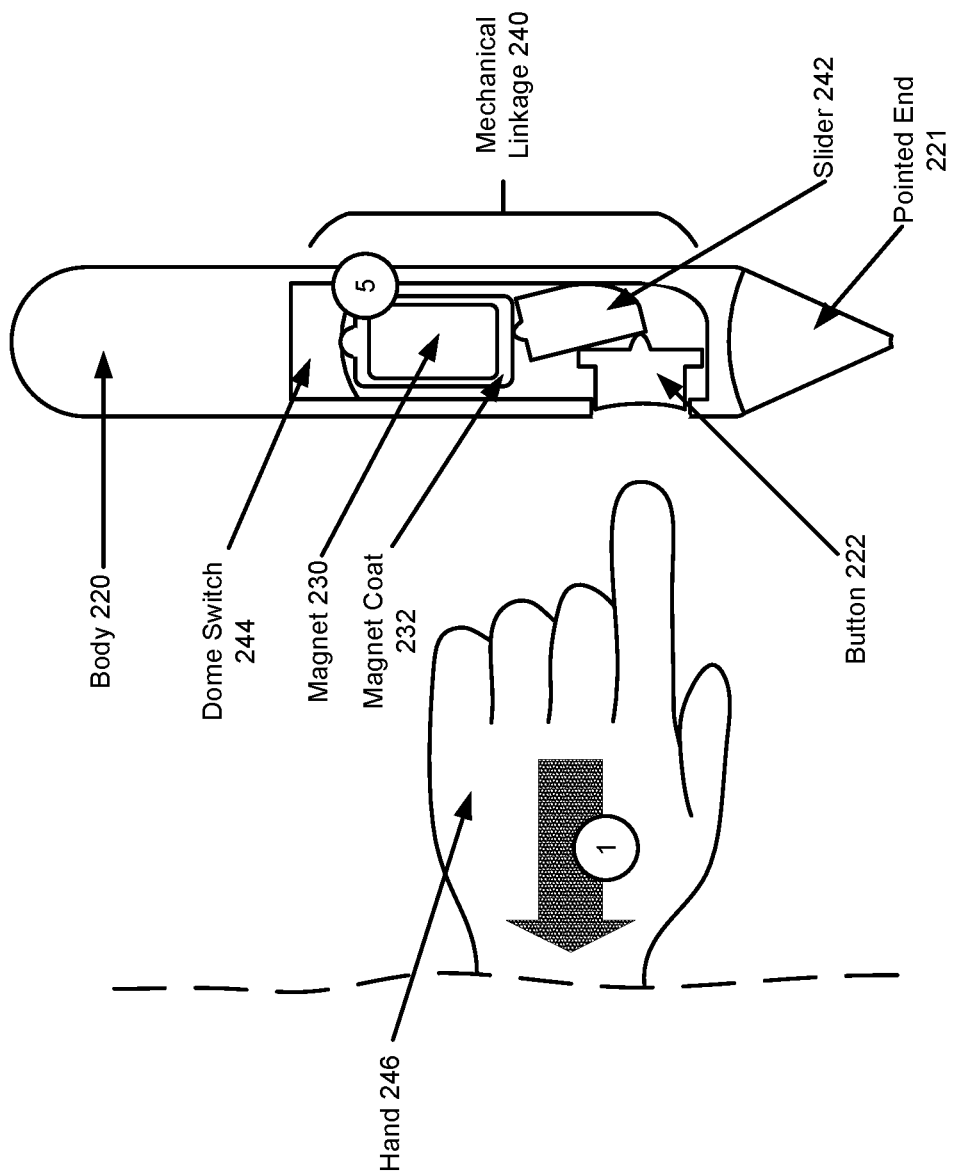

Turning to FIG. 2G, a fourth cross section diagram showing human interface device 104 in accordance with an embodiment is shown. As seen in FIG. 2G, once a user is satisfied with the supplied user input, the user may release pressure on button 222 by moving hand 246. For example, a finger used to apply force to button 222 may be released thereby decreasing the fifth force applied to dome switch 244. If the decreased force falls below the threshold, then dome switch 244 may rapidly revert back to the first shape.

Figure 2H:
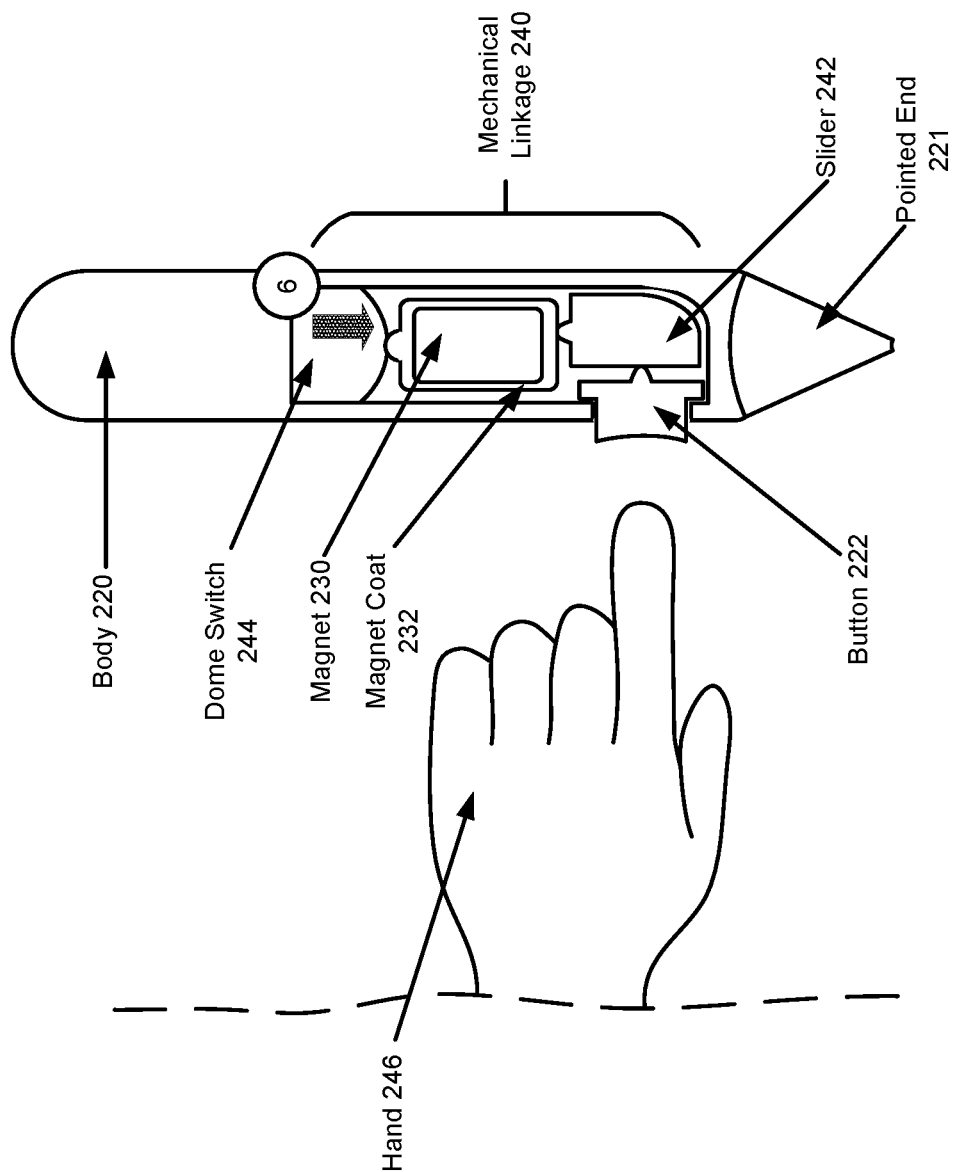

Turning to FIG. 2H, a fifth diagram showing human interface device 104 in accordance with an embodiment is shown. As seen in FIG. 2H, reversion of dome switch 244 to the first shape may apply a force to magnet 230. This reversion of dome switch 244 and applied force may accelerate magnet 230 from the second position to the first position and restrict magnet 230 to the first position (as illustrated in both FIGS. 2D and 2H). This acceleration, similar to the previous acceleration of magnet 230 discussed with respect to FIG. 2G, may be identified by the sensing system as a user input.

While FIGS. 2A-2H have been illustrated as including specific numbers and types of components, it will be appreciated that any of the devices depicted therein may include fewer, additional, and/or different components without departing from embodiments disclosed herein.

As discussed above, the components of FIG. 1 may perform various methods to provide computer implemented services using user input. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of obtaining user input in accordance with an embodiment is shown. The method may be performed by data processing system 100, sensing system 102, human interface device 104, and/or other components of the system of FIG. 1.

At operation 300, a motion of a magnet is monitored. The motion may be monitored by sensing properties, such as an orientation, position, and/or acceleration, of a magnet with respect to a sensing system. These properties may be sensed by (i) obtaining measurements of a magnetic field emanating from the magnet, and (ii) computing the position, orientation, and/or acceleration based on the measurements. For example, upon actuation of a button (e.g., button 222 of FIGS. 2A, 2D-2H) with a force that exceeds the previously discussed threshold of dome switch 244, a magnet (e.g., 230) may accelerate rapidly thereby creating a pattern of changes in magnetic field strength that can be distinguished from changes in sensed magnetic field strength due to other causes such as repositioning of a human interface device.

At operation 302, pattern matching of the motion of the magnet against motion patterns is performed to identify a matched motion pattern. The pattern matching may be performed by (i) analyzing the motion of the magnet to identify a motion pattern and (ii) matching the motion pattern against known motion patterns (which may be associated with different types of actuations of the human interface device).

The known motion patterns may be included in a database. These motion patterns in the database may be associated with various respective types of actuations of the human interface device (and may correspond to different user input). Once a motion pattern is found to match the magnet motion pattern, the associated type of user input and/or actuation of the human interface device may be identified.

In an embodiment, the motion pattern is matched against the motion patterns using an inference model. The inference model may be trained machine learning model. The trained machine learning model may generalize a set of relationships defined by training data. The training data may include different types of motion patterns and/or labels for the motion patterns (or may be unlabeled). To perform the matching, the motion pattern may be ingested by the inference model, and the inference model may output an indication of one of the motion patterns. The inference model may be implemented using other types of learning models (e.g., decision trees, support vector machines, etc.) without departing from embodiments disclosed herein. The learning model may be trained using supervised or unsupervised learning.

At operation 304, based on the matched motion pattern, an actuation of an actuatable member of the human interface device is identified. The actuation may be identified based on associations between the matched motion pattern and the actuation (e.g., different motion patterns may be associated with similar or different actuations).

At operation 306, user input is provided based on the actuation of the actuatable member. The user input may be provided by checking a second database (that may or may not be the same database as the first database) for a command associated with the actuation of the human interface device. This command may be known to a processor or other entity (e.g., program) of a computer device that is operably connected to the human interface device. For example, actuation of an actuatable member may indicate, to a data processing system, to change a setting of the data processing system, launch performance of a processes, or perform other types of actions.

The command may also be identified by, for example, using the position of the human interface device to identify a change in focus of the user (e.g., a cursor location on a display). The combination of the focus of the user and the user input (e.g., based on the user clicking an actuatable portion of a human interface device) may then be used to identify, for example, a function of an application or other type of functionality to be initiated or otherwise performed.

Based on the user input, the command may be performed. The command may be performed, for example, by an operating system passing through or otherwise providing information regarding the command to an application or other type of consumer of the user input. The consumer may then take action based on the command.

The method may end following operation 306.

Thus, using the method illustrated in FIG. 3, embodiments disclosed herein may facilitate obtaining user input and using the user input to provide computer implemented services. By obtaining the user input via a passive device (at least with respect to user input), a human interface device in accordance with embodiments disclosed herein may be of lower complexity thereby improving the likelihood of continued operation, may not be dependent on power sources, may not require as large of physical loads to be exerted by users, and/or may provide other benefits.

Figure 4:
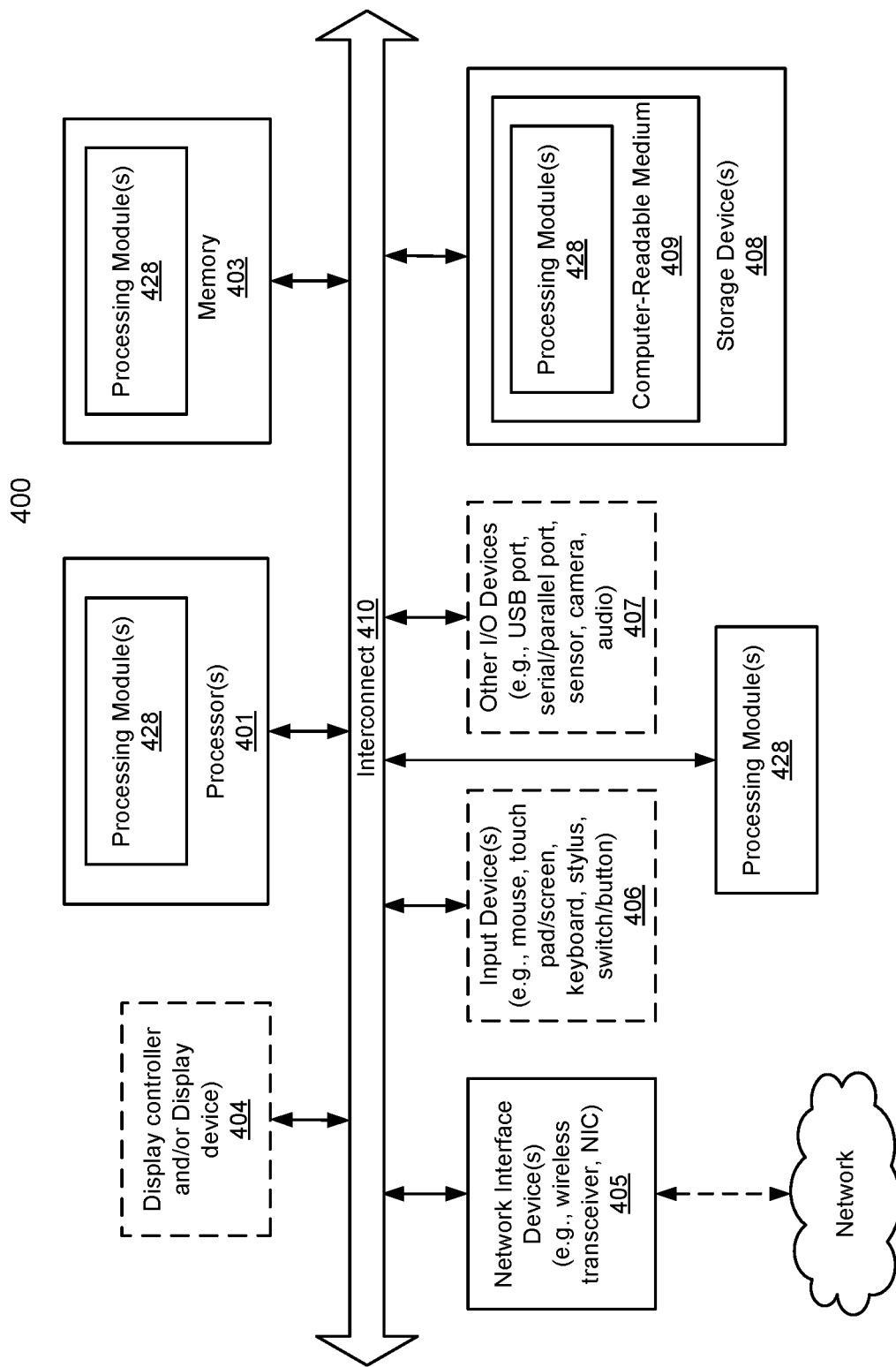
FIG. 4 shows a block diagram illustrating a data processing system in accordance with an embodiment.

Any of the components illustrated in FIGS. 1-2H may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/ioS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A human interface device, comprising:
   a body movable through application of force by a user;
   a magnet positioned with the body, the magnet emanating a magnetic field distribution that extends into an ambient environment proximate to the human interface device;
   a magnet coat that is disposed within the human interface device and that covers the magnet;
   a button; and
   a mechanical linkage adapted to:
      receive a force from the button;
      in a first instance of the force that falls below a threshold:
         retain a first position of the magnet within the body; and
      in a second instance of the force that exceeds the threshold:
         accelerate the magnet in a first direction to move the magnet to a second position within the body; and
         after the force is reduced, return the magnet to the first position.

2. The human interface device of claim 1, wherein the button is adapted to move between two positions along a motion path, and the motion path is aligned with a second direction that is different from the first direction, and wherein the magnet coat covers an entirety of the magnet and comprises a sliding friction reducing material that protects the magnet from the sliding friction.

3. The human interface device of claim 2, wherein while in the first position, at least a portion of the button is exposed above a surface of the body, and while in the second position, at least a sub portion of the portion of the button is recessed below the surface of the body.

4. The human interface device of claim 2, wherein the mechanical linkage comprises:
   a slider adapted to:
      receive a force in the second direction from the button; and
      apply a force in the first direction to the magnet,
   wherein the slider is in direct contact with the magnet coat instead of with the magnet.

5. The human interface device of claim 3, wherein the mechanical linkage further comprises:
   a concave ramp adapted to:
      restrict movement of the slider to a second motion path, the second motion path comprising a curved path.

6. The human interface device of claim 3, wherein the mechanical linkage further comprises:
   an elastic member adapted to:
      transition between two shapes, while in a first shape of the two shapes, the elastic member maintains the magnet in the first position, and while in a second shape of the two shapes, the elastic member allows the magnet to move to the second position,
   wherein while in the second shape, the elastic member exhibits internal strain to transition to the first shape.

7. The human interface device of claim 6, wherein the elastic member comprises a dome switch.

8. A system, comprising:
   a human interface device comprising a magnet covered by a magnet coat disposed within the human interface device; and
   a sensing system adapted to:
      monitor motion of the magnet;

perform pattern matching of the motion of the magnet against motion patterns to identify a matched motion pattern;

identify, based on the matched motion pattern, an actuation of an actuatable member of the human interface device; and provide user input based on the actuation of the actuatable member.

9. The system of claim 8, wherein the motion patterns comprise:
a first motion pattern specifying a first acceleration of the magnet in a first direction that exceeds a first threshold; and
a second motion pattern specifying a second acceleration of the magnet in a second direction that exceeds a second threshold.

10. The system of claim 9, wherein the first motion pattern is associated with an actuation of a button on the human interface device.

11. The system of claim 10, wherein the second motion pattern is associated with a release of the actuation of the button on the human interface device.

12. The system of claim 11, wherein the first motion pattern further specifies a first distance of travel of the magnet in the first direction.

13. The system of claim 12, wherein the second motion pattern further specifies a second distance of travel of the magnet in the second direction.

14. The system of claim 13, wherein the motion of the magnet is matched to the first motion pattern when the magnet is accelerated above the first threshold and travels a distance up to the first distance after being accelerated above the threshold.

15. The system of claim 14, wherein the motion of the magnet is matched to the second motion pattern when the magnet is accelerated above the second threshold and travels a distance up to the second distance after being accelerated above the second threshold.

16. The system of claim 15, wherein the motion pattern further comprises:
a third motion pattern specifying a third acceleration of the magnet in any direction that that does not exceed the first threshold or the second threshold.

17. The system of claim 16, wherein the third motion pattern is associated with an actuation of a body on the human interface device that move the human interface device.

18. The system of claim 17, wherein the human interface device comprises:
the body movable through application of force by a user;
the magnet positioned with the body, the magnet emanating a magnetic field distribution that extends into an ambient environment proximate to the human interface device;
the button; and
a mechanical linkage adapted to:
receive a force from the button;
in a first instance of the force that falls below a threshold:
retain a first position of the magnet within the body;
in a second instance of the force that exceeds the threshold:
accelerate the magnet in a first direction to move the magnet to a second position within the body; and
after the force is reduced, return the magnet to the position.

19. The system of claim 18, wherein the sensing system comprises a magnetic field sensor positioned to sense a portion of the magnetic field distribution.

20. The human interface device of claim 1, wherein the magnet is positioned further away from a first end of the human interface device that comes into contact with a sensing system than the button.

* * * * *